United States Patent
Ji

(10) Patent No.: US 11,231,882 B2
(45) Date of Patent: Jan. 25, 2022

(54) DATA STORAGE DEVICE WITH IMPROVED READ PERFORMANCE AND OPERATING METHOD THEREOF

(71) Applicant: SK hynix Inc., Gyeonggi-do (KR)

(72) Inventor: Seung Gu Ji, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/909,523

(22) Filed: Jun. 23, 2020

(65) Prior Publication Data

US 2021/0165607 A1 Jun. 3, 2021

(30) Foreign Application Priority Data

Dec. 2, 2019 (KR) .................. 10-2019-0158106

(51) Int. Cl.
*G06F 3/06* (2006.01)

(52) U.S. Cl.
CPC .......... *G06F 3/0659* (2013.01); *G06F 3/0613* (2013.01); *G06F 3/0653* (2013.01); *G06F 3/0679* (2013.01)

(58) Field of Classification Search
CPC .... G06F 3/0659; G06F 3/0679; G06F 3/0613; G06F 3/0653; G06F 3/061; G06F 3/0656; G06F 3/0655; G06F 3/0611; G06F 12/0246; G11C 16/26

USPC ........ 711/157, 5, 103, 118, 127; 365/230.04
See application file for complete search history.

(56) References Cited

U.S. PATENT DOCUMENTS

| | | | | |
|---|---|---|---|---|
| 5,987,570 A | * | 11/1999 | Hayes .............. | G06F 12/0884 710/35 |
| 2008/0055993 A1 | * | 3/2008 | Lee .................. | G11C 16/10 365/185.11 |
| 2019/0340125 A1 | * | 11/2019 | Mondello .......... | G11C 29/846 |
| 2020/0176048 A1 | * | 6/2020 | Jin ................... | G06F 13/1673 |

FOREIGN PATENT DOCUMENTS

KR 10-2017-0140467 12/2017

* cited by examiner

*Primary Examiner* — Hong C Kim
(74) *Attorney, Agent, or Firm* — IP & T Group LLP

(57) ABSTRACT

A data storage device may include: a nonvolatile memory apparatus including a plurality of groups configured by dividing a plurality of planes in interleaving units; and a controller configured to check whether a group including a read region of a current read command is included in a group including a read operation of a previous read command and whether the read region of the current read command extends over two or more groups, when receiving the current read command, and control the nonvolatile memory apparatus to perform cache read or interleaving read based on the check result.

17 Claims, 12 Drawing Sheets

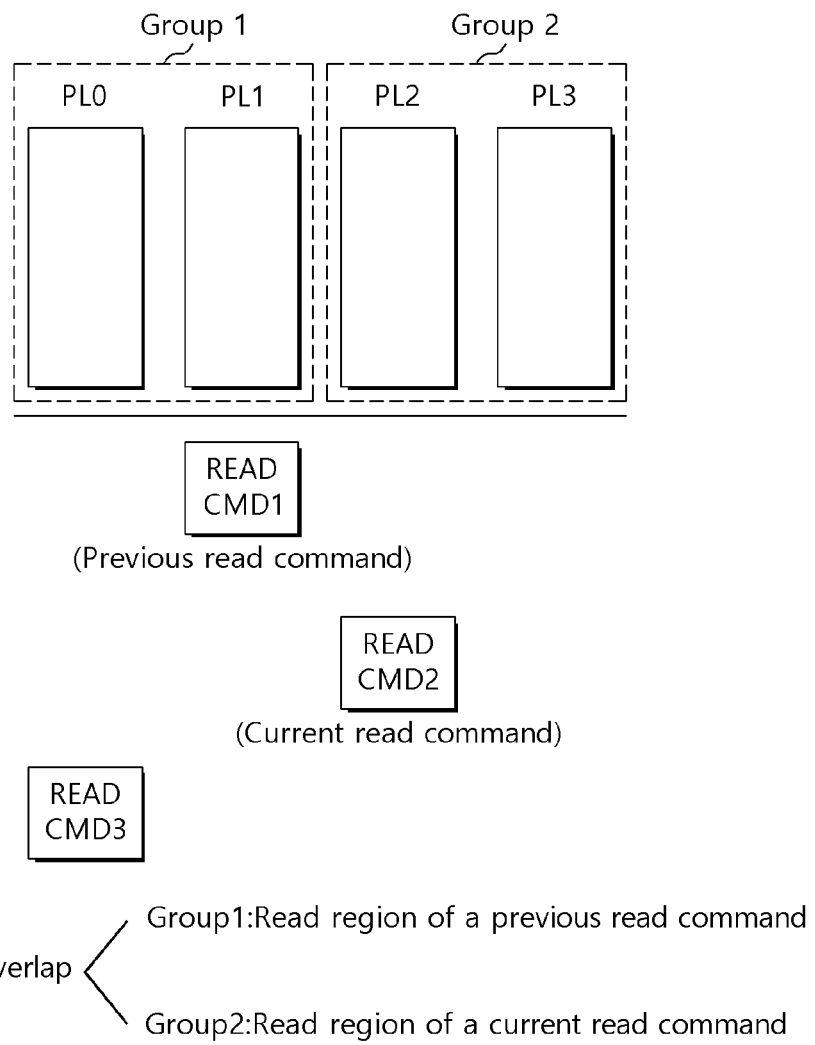

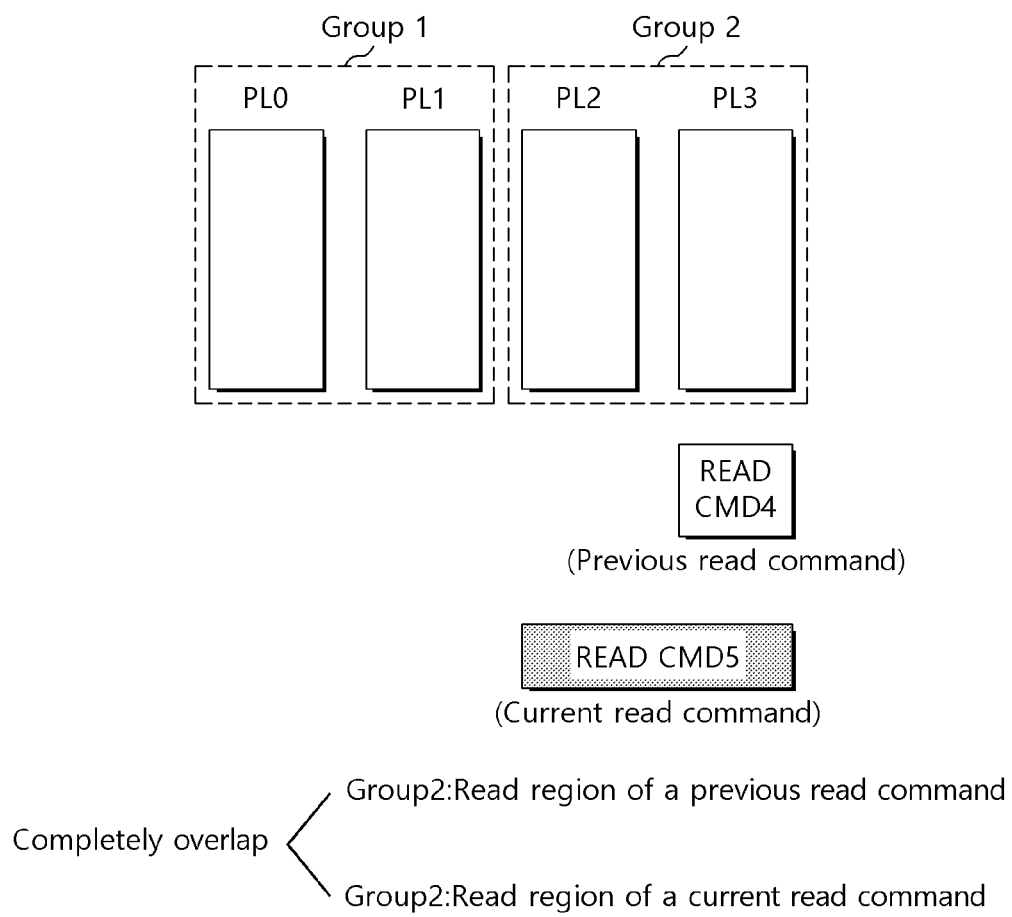

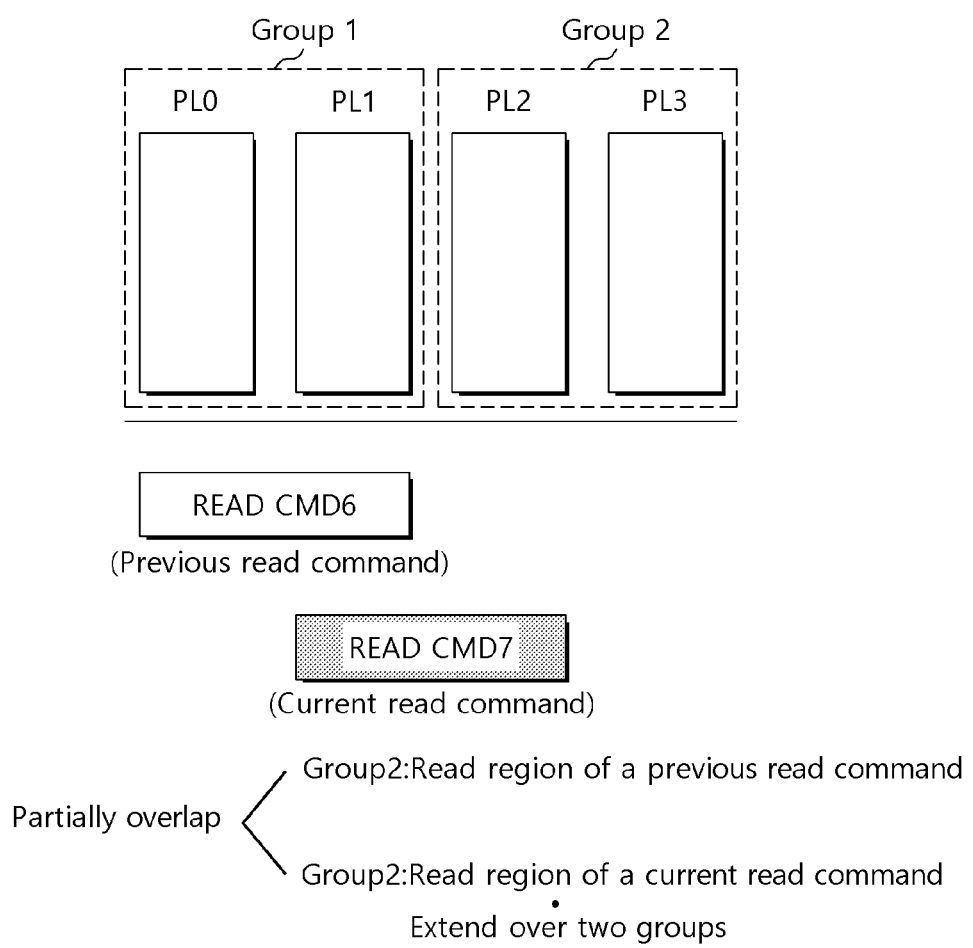

DATA STORAGE DEVICE WITH IMPROVED READ PERFORMANCE AND OPERATING METHOD THEREOF

CROSS-REFERENCE TO RELATED APPLICATION

The present application claims priority under 35 U.S.C. § 119(a) to Korean application number 10-2019-0158106, filed on Dec. 2, 2019, in the Korean Intellectual Property Office, which is incorporated herein by reference in its entirety.

BACKGROUND

1. Technical Field

Various embodiments generally relate to a data storage device and an operating method thereof.

2. Related Art

Recently, the paradigm for the computing environment has changed to ubiquitous computing in which computer systems can be used anytime anywhere. Therefore, the use of portable electronic devices such as mobile phones, digital cameras and notebook computers has rapidly increased. Such portable electronic devices generally use a data storage device using a memory device. The data storage device is used to store data which are used in the portable electronic devices.

Since a data storage device using a memory device has no mechanical driver, the data storage device has excellent stability and durability, high information access speed, and low power consumption. Examples of data storage devices having such advantages include an USB (Universal Serial Bus) memory device, a memory card having various interfaces, an UFS (Universal Flash Storage) device, and an SSD (Solid State Drive).

During a data read operation, a plane interleaving read operation is performed to increase the performance of random read, and a cache read operation is performed to increase the performance of full page read.

As various sizes of workloads are used, the read operation needs to be applied in various sizes.

SUMMARY

Various embodiments are directed to a data storage device with enhanced read performance and an operating method thereof.

In an embodiment, a data storage device may include: a nonvolatile memory apparatus comprising a plurality of groups, each including one or more planes, the groups being operable as respective interleaving units; and a controller configured to: check whether a current read group including a read region of a current read command and a previous read group including a read operation of a previous read command completely or partially overlap and whether the read region of the current read command extends over two or more groups, when receiving the current read command, and control the nonvolatile memory apparatus to perform cache read or interleaving read on the current read group based on the check result.

In an embodiment, there is provided an operating method of a data storage device which includes a nonvolatile memory apparatus having a plurality of groups, each including one or more planes, the groups being operable as respective interleaving units, the operating method comprising the steps of: receiving a read command; checking whether a current read group including a read region of a current read command and a previous read group including a read region of a previous read command completely or partially overlap and whether the read region of the current read command extends over two or more groups; and controlling the nonvolatile memory apparatus to perform cache read or interleaving read on the current read group based on the checking result.

In an embodiment, there is provided an operating method of a controller which includes controlling a nonvolatile memory device to perform a cache read operation on planes disposed over two or more of plural groups in the nonvolatile memory device; and controlling the nonvolatile memory device to perform, in response to a current read command, the cache read operation on planes disposed in a current group among the plural groups when a previous group of a previous read command and the current group at least partially overlap in units of planes, wherein an interleaving read operation is performed on one or more planes disposed within each of the plural groups, and wherein the interleaving read operation is not performed on the planes disposed over two or more among the plural groups.

In accordance with the present embodiment, the data storage device and the operating method thereof may selectively apply an interleaving read operation and a cache read operation during a read operation. Thus, the entire processing time of the read operation can be shortened, which makes it possible to expect that the performance of the data storage device will be able to be improved.

BRIEF DESCRIPTION OF THE DRAWINGS

FIGS. 3A, 3B, and 3C are diagrams for describing a method for deciding a read command in accordance with an embodiment.

DETAILED DESCRIPTION

Hereinafter, a data storage device and an operating method thereof are described below with reference to the accompanying drawings through various embodiments. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

Figure 1:
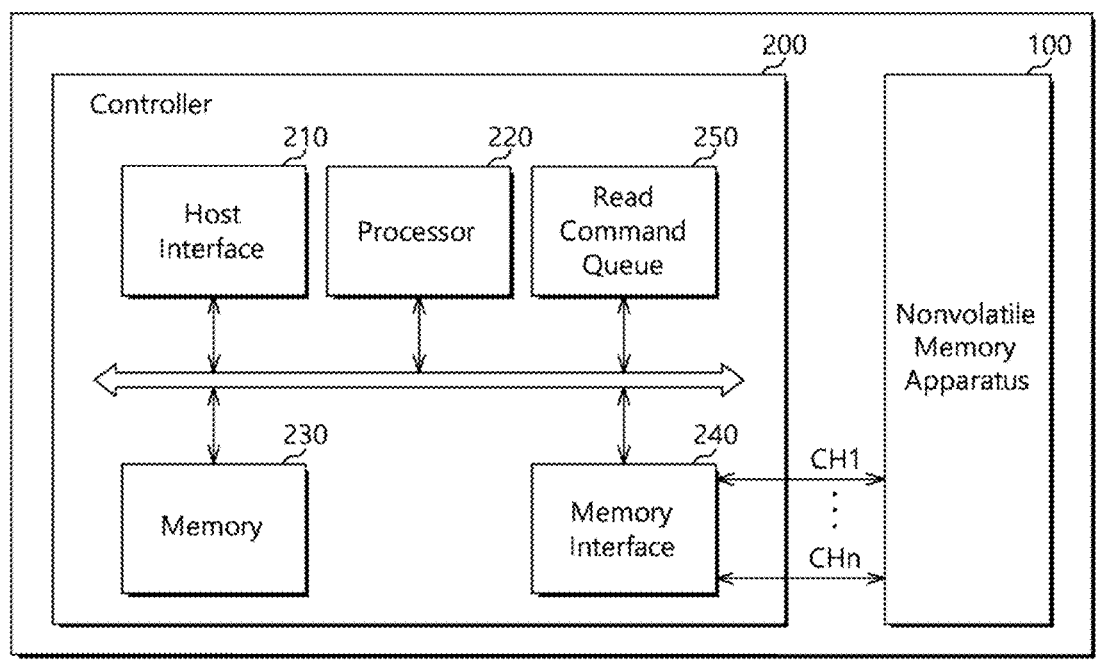
FIG. 1 is a diagram illustrating a configuration of a data storage device in accordance with an embodiment.

FIG. 1 is a diagram illustrating a configuration of a data storage device in accordance with an embodiment.

Figure 2:
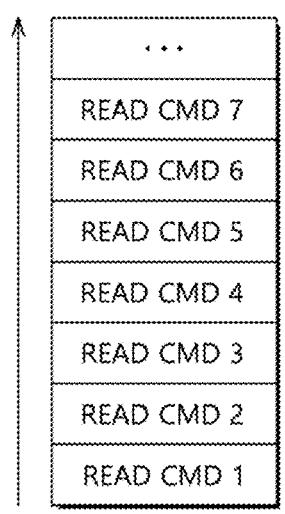
FIG. 2 is a diagram illustrating an example of a read command queue in accordance with an embodiment.

Hereafter, the configuration of the data storage device in accordance with the present embodiment will be described with reference to FIG. 2 illustrating an example of a read command queue in accordance with the present embodiment and FIGS. 3A, 3B, and 3C illustrating a method for deciding a read command in accordance with the present embodiment.

Referring to FIG. 1, the data storage device 10 may store data accessed by a host device (not illustrated) such as a mobile phone, MP3 player, laptop computer, desktop computer, game machine, TV or in-vehicle infotainment system. The data storage device 10 may also be referred to as a memory system.

The data storage device 10 may be fabricated as any of various types of storage devices, according to an interface protocol coupled to the host device. For example, the data storage device 10 may be configured as an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card and/or a memory stick.

The data storage device 10 may be fabricated as any of various types of packages. For example, the data storage device 10 may be fabricated as a POP (Package-On-Package), SIP (System-In-Package), SOC (System-On-Chip), MCP (Multi-Chip Package), COB (Chip-On-Board), WFP (Wafer-level Fabricated Package) and/or WSP (Wafer-level Stack Package).

Specifically, the data storage device 10 may include a nonvolatile memory apparatus 100 and a controller 200.

The nonvolatile memory apparatus 100 may include a plurality of groups (Group 1, Group 2 in FIGS. 3A, 3B, and 3C) of planes configured by dividing a plurality of planes (PL0, PL1, PL2, PL3 in FIGS. 3A, 3B, and 3C) into groups of planes thus forming respective interleaving units. This configuration is described below in detail with reference to FIGS. 3A 3B, 3C, and 4.

The nonvolatile memory apparatus 100 may perform cache read or interleaving read according to a read command transferred from the controller 200. This process is described below in more detail.

The nonvolatile memory apparatus 100 may operate as a storage medium of the data storage device 10. The nonvolatile memory apparatus 100 may be configured as any of various types of nonvolatile memory apparatuses such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and/or ReRAM (Resistive Random Access Memory) using transition metal oxide, depending on memory cells.

The nonvolatile memory apparatus 100 may include a memory cell array (not illustrated) having a plurality of memory cells arranged at the respective intersections between a plurality of bit lines (not illustrated) and a plurality of word lines (not illustrated). For example, each of the memory cells of the memory cell array may be a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array may include one or more of SLCs, MLCs, TLCs and QLCs. For example, the memory cell array may include memory cells with a two-dimensional horizontal structure or memory cells with a three-dimensional vertical structure.

When receiving a read command, the controller 200 may check whether a current read group including a read region of a current read command and a previous read group including a read region of a previous read command completely or partially overlap and whether the read region of the current read command extends over two or more groups, and control the nonvolatile memory apparatus 100 to perform cache read or interleaving read based on the result of the check operation. In an embodiment, the read region of the current read command may include one or more planes (PL0, PL1, PL2, PL3 of FIGS. 3A, 3B, and 3C).

In this description, a read region of a read command is a target storage region, from which data is read in response to the read command.

Figure 4:
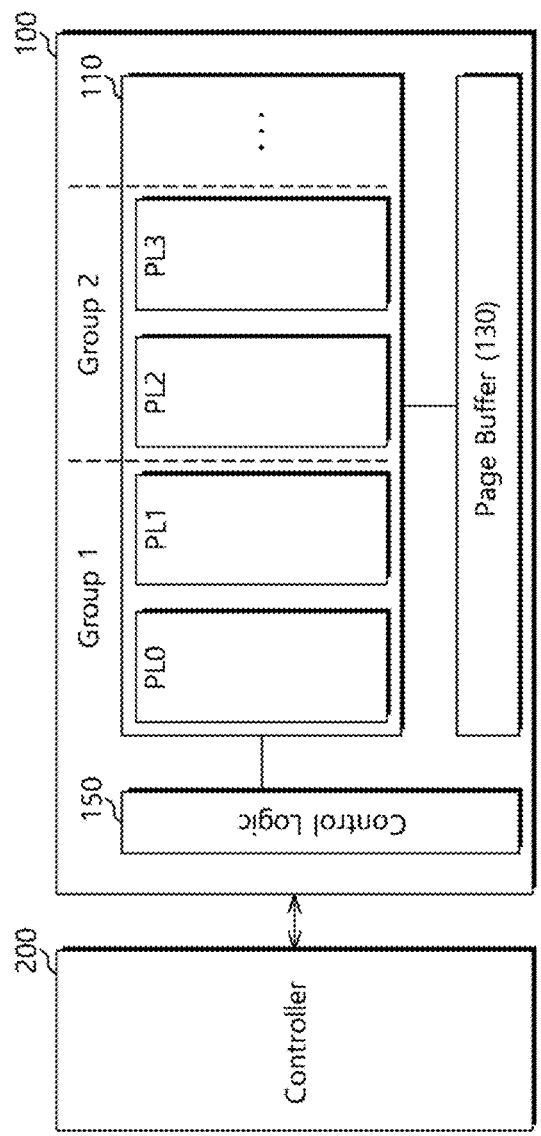
FIG. 4 is a diagram illustrating a configuration of a nonvolatile memory apparatus in accordance with an embodiment.

During the cache read, a data read operation tR and a data output operation Dout are performed in parallel. Referring to FIG. 4, the data read operation tR senses data in a memory cell array 110 and moves that data to a page buffer 130, and the data output operation Dout outputs read data from the page buffer 130 to an external destination. When the data read operation tR and the data output operation Dout are performed in parallel, it may indicate that the data read operation tR and the data output operation Dout can be performed at the same time. A group including a target plane of the data read operation tR and a group including a target plane of the data output operation Dout may be the same as each other or partially overlap each other.

During the interleaving read, the data read operation tR of sensing data from the memory cell array 110 and moving that data to the page buffer 130 are performed in parallel on one or more the planes PL0, PL1, PL2, PL3. In the present embodiment, one or more of the planes where the interleaving read is performed may belong to different groups.

The group may include one or more planes. A group may operate as an interleaving unit, within which an interleaving read may be performed on the planes of that interleaving unit. A plurality of planes of the memory cell array 110 may be divided into the groups which operate as the interleaving units. An interleaving read may be performed on one or more planes within a group. An interleaving read may not be performed on planes in different groups. On the other hand, a cache read may be performed on planes in different groups in response to a single read command such as a single sequential read command for reading a substantial amount of data from memory blocks distributed over plural planes.

Specifically, the group may be configured by a single plane or a plurality of planes. For example, as illustrated in FIG. 4, the group Group 1 may include a plurality of planes, i.e. the plane PL0 and the plane PL1, but include only the plane PL0. More generally, each group may include one or more planes, depending on system configuration and intended use. The plurality of planes included in the above-described multi-plane may perform data read operations tR in parallel according to one read command.

When all or part of the current read group overlaps the previous read group (i.e., when the current and previous read groups of the consecutive read commands partially or completely overlap), the controller 200 may control the nonvolatile memory apparatus 100 to perform cache read on the current read group.

Specifically, when a part of the current read group overlaps the previous read group, the interleaving read operation of performing the data read operations tR in parallel within the same group cannot be performed. Thus, the controller 200 instructs the nonvolatile memory apparatus 100 to perform the cache read. That is, when the data read operation tR for a current read command needs to overlap the data read operation tR for a previous read command among consecutive read commands (e.g., when the data read operations for both of the current and previous read commands are supposed to be performed on the same target plane), the plane as the common target of the current and previous data read operations cannot be accessed at the same time, and thus the data read operation tR for the current read command cannot be performed in parallel with the data read operation tR for the previous read command. Thus, the controller 200 instructs the nonvolatile memory apparatus 100 to perform a cache read on the current read group.

As exemplified in FIGS. 2 and 3, read operations may be performed on the planes according to the interleaving scheme in response to the read commands Read CMD 1 to Read CMD 4 since the current read group and the previous read group do not overlap. For example, the current read group Group 2 including a read region (Plane 2) as a target of the current read command Read CMD 2 and the previous read group Group 1 including a read region (Plane 1) as a target of the previous read command Read CMD 1 do not overlap.

However, as exemplified in FIGS. 2 and 3, the controller 200 may check a current read group Group 2 of a current read command Read CMD 5 and a previous read group Group 2 of a previous read command Read CMD 4 through a read command queue 250. When the result of that check indicates that Group 2 including a read region (Planes 2 and 3) as a target of the current read command Read CMD 5 and Group 2 including a read region (Plane 3) as a target of the previous read command Read CMD 4 completely overlap, the controller 200 may control the nonvolatile memory apparatus 100 to perform the cache read on the read region (Planes 2 and 3) of the current read group Group 2.

Also as exemplified in FIGS. 2 and 3, the controller 200 may check current read groups Group 1 and Group 2 of a current read command Read CMD 7 and a previous read group Group 1 of a previous read command Read CMD 6 through the read command queue 250. When the check result indicates that the current read groups Group 1 and Group 2 including a read region (planes 1 and 2) as a target of the current read command Read CMD 7 and the previous read group Group 1 including a read region (planes 0 and 1) as a target of the previous read command Read CMD 6 partially overlap, the controller 200 may also control the nonvolatile memory apparatus 100 to perform the cache read on the read region (Planes 1 and 2) of the current read groups Group 1 and Group 2.

When the read region of the current read command extends over two or more groups (i.e., target planes of the current read command are disposed over two or more groups), the controller 200 may control the nonvolatile memory apparatus 100 to perform the cache read on the current read groups.

When FIGS. 3A, 3B, and 3C are based on the supposition that the current read command is Read CMD 7 and the previous read command Read CMD 6 is not present, the controller 200 may control the nonvolatile memory apparatus 100 to perform the cache read on the current read groups Group 1 and Group 2 according to the read command Read CMD 7.

When a current read group and a previous read group do not overlap, the controller 200 may control the nonvolatile memory apparatus 100 to perform the interleaving read on the current read group. When the current read group and the previous read group do not overlap each other, the data read operations tR can be performed in parallel on target planes respectively within the current and previous read groups through the interleaving read. Thus, the controller 200 instructs the nonvolatile memory apparatus 100 to perform the interleaving read on the current read group.

Referring to FIGS. 2 and 3, the controller 200 may check the current read group Group 1 of a current read command Read CMD 3 and the previous read group Group 2 of a previous read command Read CMD 2 through the read command queue 250. When the check result indicates that the group Group 1 including a read region (Plane 0) of the current read command Read CMD 3 and the group Group 2 including a read region (Plane 2) of the previous read command Read CMD 2 do not overlap, the controller 200 may control the nonvolatile memory apparatus 100 to perform the interleaving read on the current read group Group 1.

The above-described method may be applied on a plurality of planes within a single current read group in the same manner. For example, the controller 200 may check the current read group Group 1 of a current read command Read CMD 6 and the previous read group Group 2 of a previous read command Read CMD 5 through the read command queue 250. When the check result indicates that the group Group 1 including a read region (Planes 0 and 1) of the current read command Read CMD 6 and the group Group 2 including a read region (Planes 2 and 3) of the previous read command Read CMD 5, the controller 200 may control the nonvolatile memory apparatus 100 to perform the interleaving read on the current read group Group 1.

The controller 200 may determine whether a current read group and a previous read group completely or partially overlap through read commands, start addresses and lengths matched with the respective read commands, and the group information which are stored in advance.

Figure 5:
FIGS. 5 and 6 are diagrams illustrating an example in which a read command is transmitted in accordance with an embodiment.

Referring to FIG. 5, when consecutively transmitting only interleaving read commands to the nonvolatile memory apparatus 100, the controller 200 may sequentially and repeatedly transmit an interleaving read command for instructing the nonvolatile memory apparatus 100 to perform the data read operation tR of moving data from the memory cell array 110 to the page buffer 130 and an interleaving read command for instructing the nonvolatile memory apparatus 100 to perform the data output operation Dout of outputting data from the page buffer 130.

Figure 6:
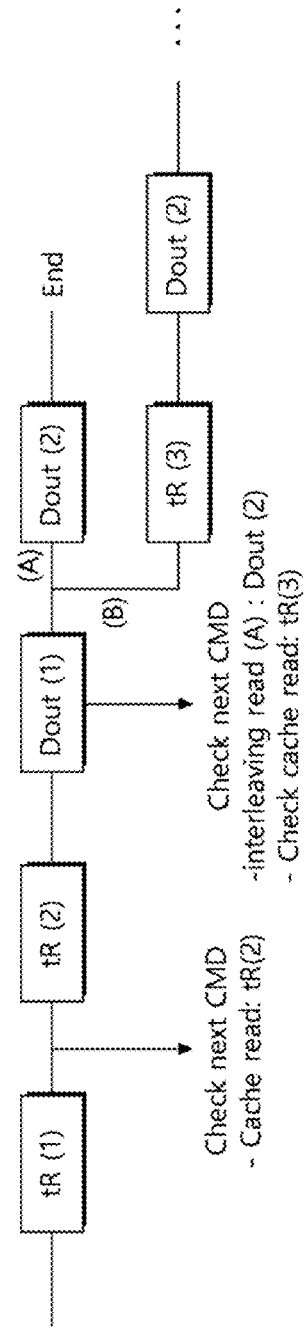

Referring to FIG. 6, the controller 200 may transmit a cache read command tR(2) for instructing the nonvolatile memory apparatus 100 to read second data, and then check whether the next read command is a cache read command or interleaving read command, based on read commands in queue 250 as illustrated in FIG. 2. Based on the check result, the controller 200 may control the nonvolatile memory apparatus 100 to perform a read operation tR(3) for third data as the cache read or an output operation Dout(2) for the second data as the interleaving read. The queued read commands for checking whether the next read command is a cache read command or an interleaving read command may be stored in the read command queue 250 or a memory 230. However, the read commands can also be stored in a separate memory external to the controller 200. The read commands may include information on whether the read commands are cache read commands or interleaving read commands.

That is, the controller 200 may decide whether to instruct the nonvolatile memory apparatus 100 to output (Dout) data, read through the previous data read operation tR, as the interleaving read according to the next read command or to instruct the nonvolatile memory apparatus 100 to read (tR) data as the cache read according to the next read command, among interleaving read commands and cache read commands are queued.

Referring to FIG. 6, the controller 200 may transmit the cache read command tR(2) for instructing the nonvolatile memory apparatus 100 to read the second data as the cache read ("-Cache read: tR(2)") and then check the next read command among the queued read commands. When the check result indicates that the next read command is an interleaving read command ("A" of FIG. 6), the controller 200 may transmit a command Dout(2) to the nonvolatile memory apparatus 100 in order to instruct the nonvolatile memory apparatus 100 to output the second data as the interleaving read.

Referring to FIG. 6, when transmitting a cache read command for instructing the nonvolatile memory apparatus 100 to output (Dout1) the first data of the first data read operation tR(1) immediately before the second data read operation tR(2), the controller 200 may check the next read command after the second data read operation tR(2).

The controller 200 may transmit the cache read command tR(2) for instructing the nonvolatile memory apparatus 100 to read the second data as the cache read ("-Cache read: tR(2)") and then check the next read command from the queued read commands. When the check result indicates that the next read command is a cache read command ("B" of FIG. 6), the controller 200 may transmit a cache read command tR(3) to the nonvolatile memory apparatus 100 in order to instruct the nonvolatile memory apparatus 100 to read the third data as the cache read.

The controller 200 may control overall operation of the data storage device 10 by driving firmware or software loaded in the memory 230. The controller 200 may decode and drive a code-based instruction or algorithm such as firmware or software. The controller 200 may be implemented in hardware or a combination of hardware and software.

The controller 200 may include a host interface 210, a processor 220, the memory 230, a memory interface 240 and the read command queue 250. Although not illustrated in FIG. 1, the controller 200 may further include an ECC (Error Correction Code) engine which generates parity data by performing ECC encoding on write data provided from a host device, and performs ECC decoding on data read from the nonvolatile memory apparatus 100 using the parity data. The ECC engine may be installed inside or outside the memory interface 240.

The host interface 210 may interface the host device and the data storage device 10 in response to a protocol of the host device. For example, the host interface 210 may communicate with the host device through any of various protocols such as USB (Universal Serial Bus), UFS (Universal Flash Storage), MMC (Multimedia Card), PATA (Parallel Advanced Technology Attachment), SATA (Serial Advanced Technology Attachment), SCSI (Small Computer System Interface), SAS (Serial Attached SCSI), PCI (Peripheral Component Interconnection) and/or PCI-e (PCI express).

The processor 220 may include an MCU (Micro Control Unit) and a CPU (Central Processing Unit). The processor 220 may process a request transmitted from the host device. In order to process the request transmitted from the host device, the processor 220 may drive a code-based instruction or algorithm, i.e. firmware, which is loaded to the memory 230, and control operations of the nonvolatile memory apparatus 100 and internal devices such as the host interface 210, the memory 230 and the memory interface 240.

The processor 220 may generate control signals for controlling an operation of the nonvolatile memory apparatus 100, based on requests transmitted from the host device, and provide the generated control signals to the nonvolatile memory apparatus 100 through the memory interface 240.

The memory 230 may include a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220. Although not illustrated in FIG. 1, the controller 200 may further include a processor-dedicated memory disposed relative to the processor 220 so as to be readily accessible by the processor 220, and the firmware and meta data stored in the memory 230 may be loaded to the processor-dedicated memory.

The memory 230 may include a data buffer for temporally storing write data which will be transmitted from the host device to the nonvolatile memory apparatus 100 or read data which are read from the nonvolatile memory apparatus 100 and will be transmitted to the host device. That is, the memory 230 may operate as a buffer memory.

FIG. 1 illustrates that the memory 230 is installed inside the controller 200, but the memory 230 may be installed outside the controller 200.

The memory interface 240 may control the nonvolatile memory apparatus 100 under control of the processor 220. When the nonvolatile memory apparatus 100 is configured as a NAND flash memory, the memory interface 240 may be referred to as an FCT (Flash Control Top). The memory interface 240 may transmit control signals, generated by the processor 220, to the nonvolatile memory apparatus 100. The control signals may include a command, an address and an operation control signal for controlling the operation of the nonvolatile memory apparatus 100. The operation control signal may include a chip enable signal, a command latch enable signal, an address latch enable signal, a write enable signal, a read enable signal, a data strobe signal and the like, but is not limited thereto. The memory interface 240 may transmit write data to the nonvolatile memory apparatus 100, or receive read data from the nonvolatile memory apparatus 100.

The memory interface 240 and the nonvolatile memory apparatus 100 may be coupled through a plurality of channels CH1 to CHn. The memory interface 240 may transmit signals, such as a command, an address, an operation control signal and data (i.e. write data), to the nonvolatile memory apparatus 100 through the plurality of channels CH1 to CHn. The memory interface 240 may receive a status signal (for example, ready/busy) and data (i.e. read data) from the nonvolatile memory apparatus 100 through the plurality of channels CH1 to CHn.

The read command queue 250 may sequentially queue read commands which are transferred from the host device (not illustrated) and will be transferred to the nonvolatile memory apparatus 100. Referring to FIG. 2, a read command Read CMD 1, a read command Read CMD 2, a read command Read CMD 3, a read command Read CMD 4, a read command Read CMD 5, a read command Read CMD 6 and the like may be sequentially queued in the read command queue 250. Each of the read commands may include contents for instructing the nonvolatile memory apparatus 100 to perform the data read operation tR or the data output operation Dout.

Although not illustrated, the read command queue 250 may be implemented for each die.

FIG. 4 is a diagram illustrating a configuration of the nonvolatile memory apparatus in accordance with an embodiment.

Hereafter, the nonvolatile memory apparatus is described with reference to FIGS. 3A, 3B, and 3C which are diagrams for describing the method for deciding a read command in accordance with an embodiment and FIGS. 5 and 6 which are diagrams illustrating an example in which a read command is transmitted in accordance with an embodiment.

Referring to FIG. 4, the nonvolatile memory apparatus 100 may include the memory cell array 110, the page buffer 130 and control logic 150.

The memory cell array 110 may include a plurality of planes which can be divided into groups that operate as interleaving units.

The page buffer 130 may store data read from the plurality of planes PL0, PL1, PL2, PL3. Although not illustrated, the page buffer 130 may include a main page buffer for storing data which are read from the memory cell array 110 and a cache page buffer for storing data which are transferred from the main page buffer and which is to be outputted to an external destination.

The control logic 150 may control an operation of the nonvolatile memory apparatus 100 based on a read command which is transmitted from the controller 200 to instruct the nonvolatile memory apparatus 100 to read or output data.

Figure 7:
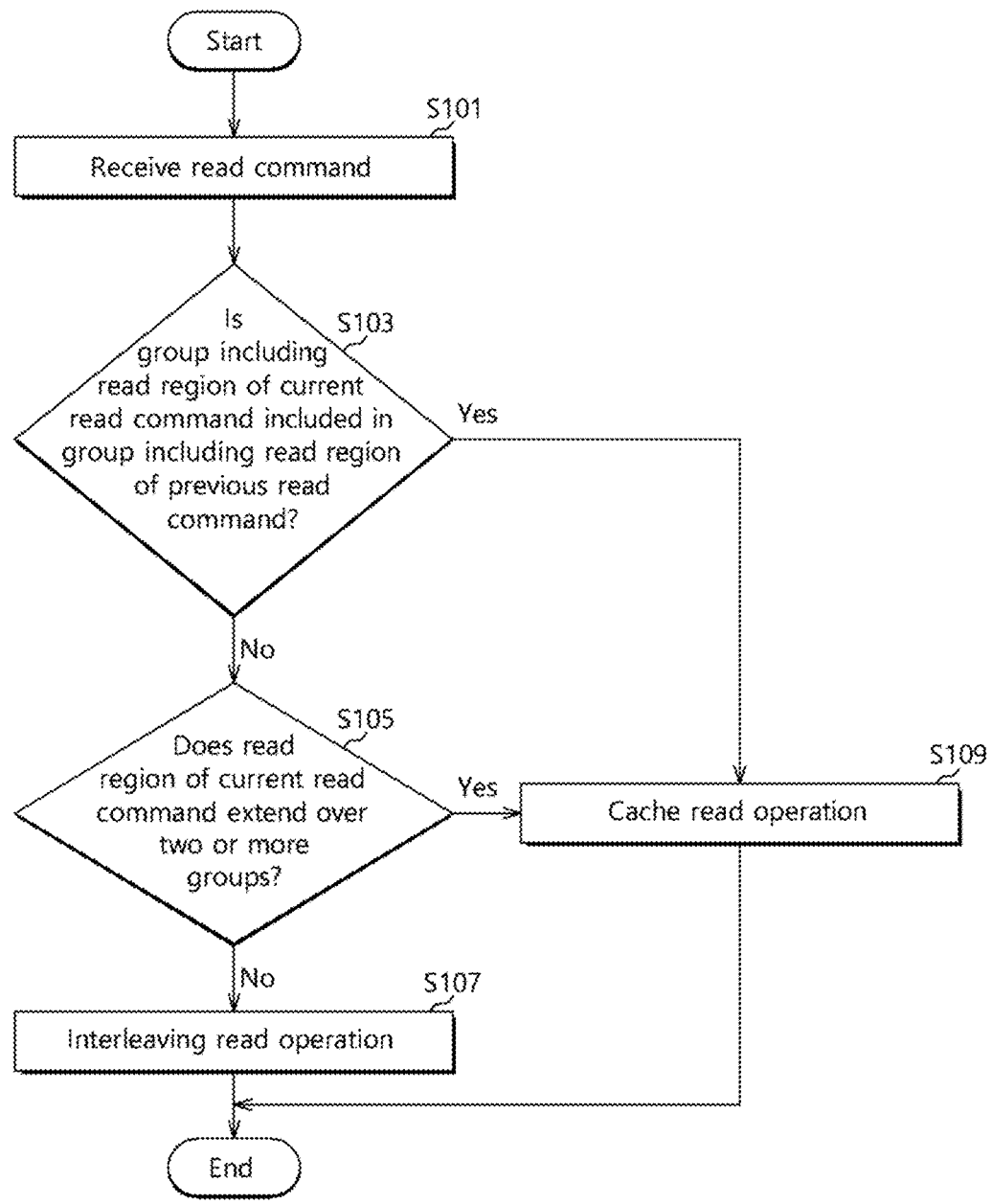
FIG. 7 is a flowchart for describing an operating method of a data storage device in accordance with an embodiment.

FIG. 7 is a flowchart illustrating an operating method of a data storage device in accordance with an embodiment.

The above-described data storage device 10 may include the nonvolatile memory apparatus 100 including a plurality of planes, which are divided into groups, each including one or more planes. Each group may function as an interleaving unit.

First, the data storage device 10 may receive a read command transferred from the host device in step S101. The data storage device 10 may queue the read command, received from the host device, in the read command queue 250 of FIG. 1. Multiple read commands may be received from the host device, and each received read command is held in the read command queue 250 until that command is transferred to the nonvolatile memory apparatus 100.

Then, the data storage device 10 may check whether a current read group including a read region of a current read command and a previous read group including a read region of a previous read command completely or partially overlap in step S103. The read region of the current read command may include one or more planes.

When the check result indicates that the current read group and the previous read group do not overlap, the data storage device 10 may check whether the read region of the current read command extends over two or more groups, in step S105.

When the check result indicates that the read region of the current read command does not extend over two or more groups, the data storage device 10 may control the nonvolatile memory apparatus 100 to perform an interleaving read operation according to the current read command in step S107.

When the check result of step S103 indicates that the current read group and the previous read group completely or partially overlap, the data storage device 10 may control the nonvolatile memory apparatus 100 to perform a cache read operation according to the current read command in step S109.

On the other hand, when the check result of step S105 indicates that the read region of the current read command extends over two or more groups, the data storage device 10 may control the nonvolatile memory apparatus 100 to perform a cache read operation according to the current read command.

For reference, when the check result of step S103 indicates that the current read group and the previous read group do not overlap, the data storage device 10 may control the nonvolatile memory apparatus 100 to perform an interleaving read operation according to the current read command.

Figure 8:
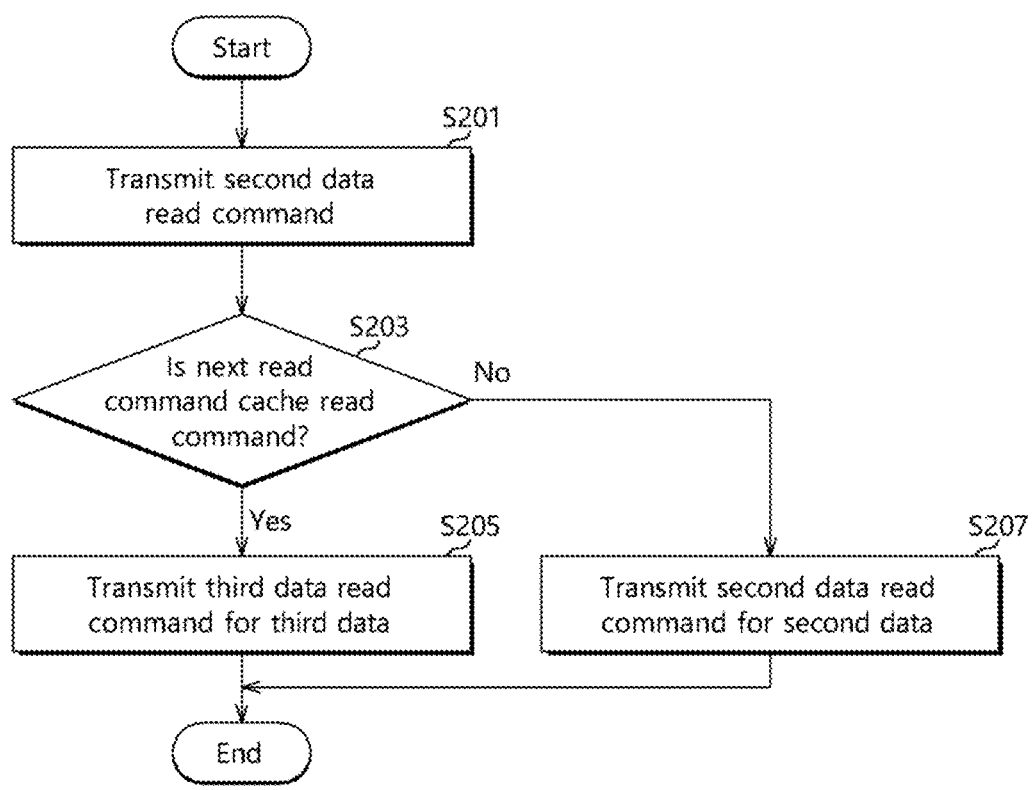
FIG. 8 is a flowchart for describing a part of the operating method of FIG. 7 in more detail.

FIG. 8 is a flowchart for describing a part of the operating method of FIG. 7 in more detail.

First, the data storage device 10 may transmit the cache read command tR(2) of FIG. 6 to the nonvolatile memory apparatus 100 in order to instruct the nonvolatile memory apparatus 100 to read the second data, in step S201.

Then, the data storage device 10 may check the next read command of the queued read commands. For example, the data storage device 10 may check whether the next read command is a cache read command, in step S203.

Referring to FIG. 6, when transmitting the cache read command Dout(1) to the nonvolatile memory apparatus 100 in order to instruct the nonvolatile memory apparatus 100 to output the first data of the first data read operation immediately before the second data read operation, the data storage device 10 may check the next read command after the second data read operation.

When the check result indicates that the next read command is a cache read command, the data storage device 10 may transmit a cache read command to the nonvolatile memory apparatus 100 in order to instruct the nonvolatile memory apparatus 100 to read the third data, in step S205.

Referring to FIG. 6, the data storage device 10 may check the next read command through the queued read commands after the cache read operation tR(2) for the second data. When the check result indicates that the next read command is a cache read command ("B" of FIG. 6), the data storage device 10 may control the nonvolatile memory apparatus 100 to perform the cache read operation tR(3) for the third data according to the third read command.

When the check result of step S203 indicates that the next read command is an interleaving read command ("A" of FIG. 6), the data storage device 10 may transmit the interleaving read command Dout(2) to the nonvolatile memory apparatus 100 in order to instruct the nonvolatile memory apparatus 100 to output the second data, in step S207.

Referring to FIG. 6, when transmitting the cache read command Dout(1) for instructing the nonvolatile memory apparatus 100 to output the first data for the first read command after the cache read operation tR(2) for the second data, the data storage device 10 may check the read command queue 250 to determine whether or not the next read command is an interleaving read command. When the check result indicates that the next read command is an interleaving read command, the data storage device 10 may control the nonvolatile memory apparatus 100 to perform the data output operation Dout(2) for the second data.

Figure 9:
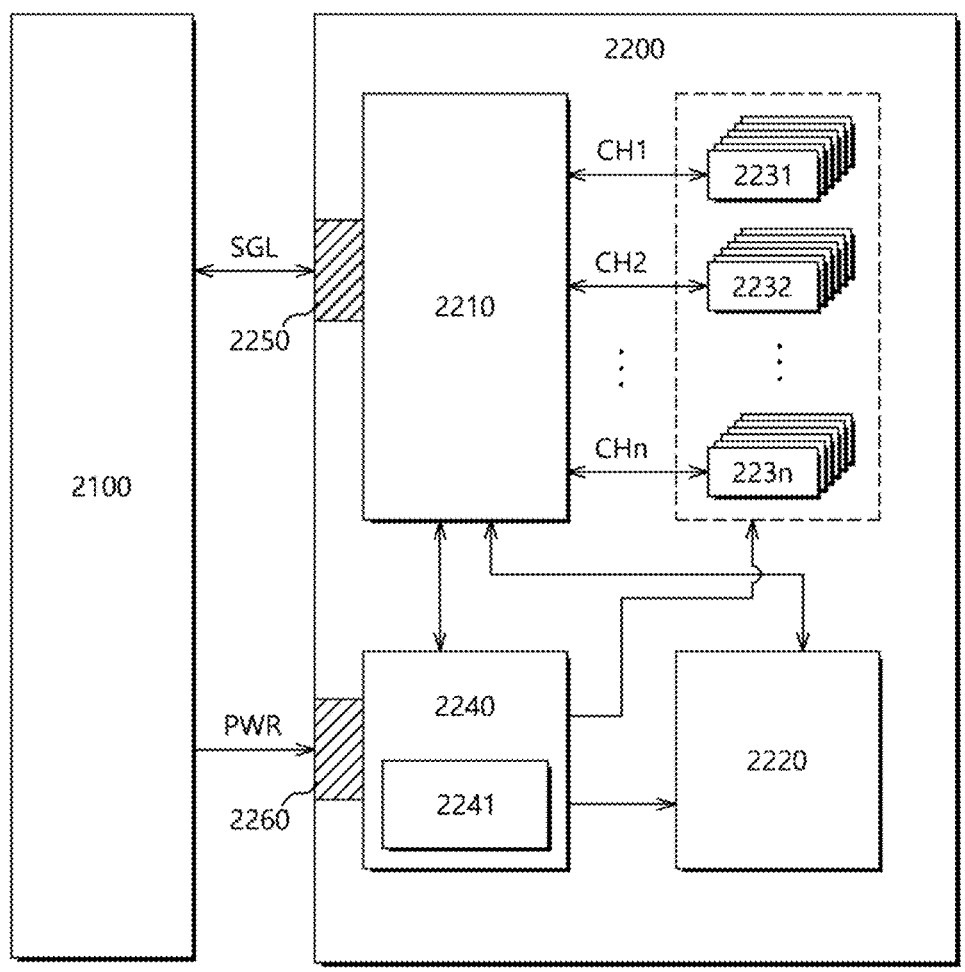
FIG. 9 is a diagram illustrating a data processing system including an SSD (Solid State Drive) in accordance with an embodiment.

FIG. 9 is a diagram illustrating a data processing system including an SSD (Solid State Drive) in accordance with an embodiment. Referring to FIG. 9, the data processing system 2000 may include a host device 2100 and the SSD 2200.

The SSD 2200 may include a controller 2210, a buffer memory device 2220, nonvolatile memory apparatuses 2231 to 223$n$, a power supply 2240, a signal connector 2250 and a power connector 2260.

The controller 2210 may control overall operation of the SSD 2200.

The buffer memory device 2220 may temporarily store data to be stored in the nonvolatile memory apparatuses 2231 to 223$n$. The buffer memory device 2220 may temporarily store data read from the nonvolatile memory apparatuses 2231 to 223$n$. The data temporarily stored in the buffer memory device 2220 may be transmitted to the host device 2100 or the nonvolatile memory apparatuses 2231 to 223$n$ under control of the controller 2210.

The nonvolatile memory apparatuses 2231 to 223$n$ may be used as storage media of the SSD 2200. The nonvolatile memory apparatuses 2231 to 223$n$ may be coupled to the controller 2210 through a plurality of channels CH1 to CHn, respectively. One channel may be coupled one or more nonvolatile memory apparatuses. The nonvolatile memory apparatuses coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally shut down the SSD 2200, when a sudden power off occurs. The auxiliary power supply 2241 may include large capacitors capable of storing the power PWR.

The controller 2210 may exchange signals SGL with the host device 2100 through the signal connector 2250. The signal SGL may include a command, an address, data and the like. The signal connector 2250 may be configured as any of various types of connectors depending on the interface between the host device 2100 and the SSD 2200.

Figure 10:
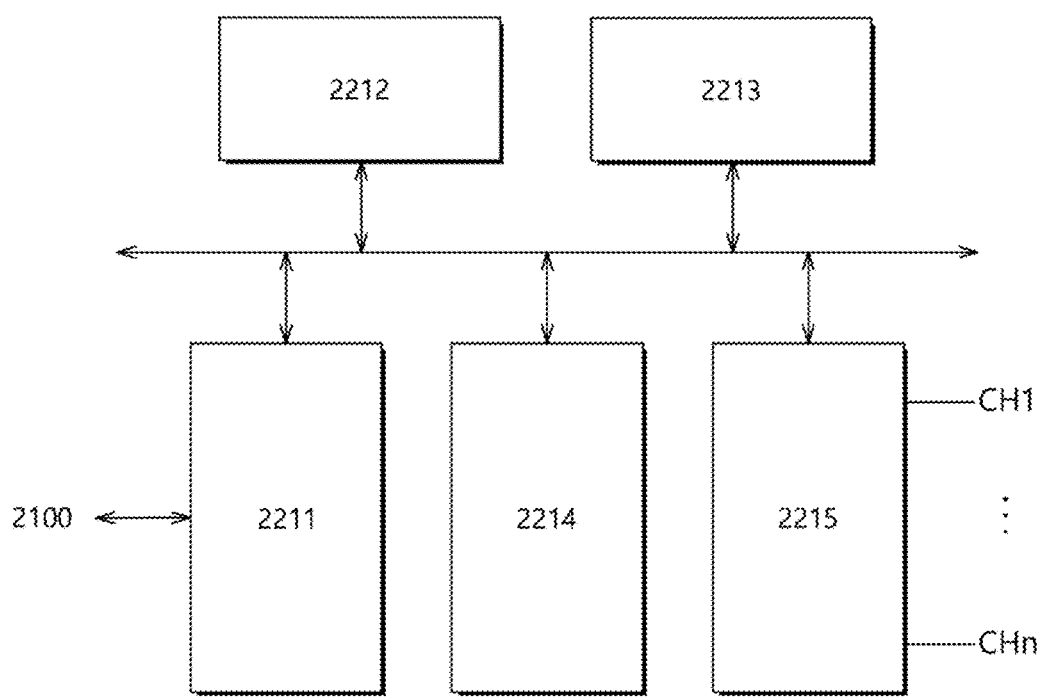
FIG. 10 is a diagram illustrating a configuration of a controller, such as that of FIG. 9.

FIG. 10 is a diagram illustrating a configuration of the controller of FIG. 9. Referring to FIG. 10, the controller 2210 may include a host interface 2211, a control component 2212, a RAM 2213, an ECC component 2214 and a memory interface 2215.

The host interface 2211 may interface the host device 2100 and the SSD 2200 according to a protocol of the host device 2100. For example, the host interface 2211 may communicate with the host device 2100 through any of various protocols such as SD (Secure Digital), USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and/or UFS (Universal Flash Storage). The host interface 2211 may perform a disk emulation function for supporting the host device 2100 to recognize the SSD 2200 as a general-purpose data storage device, for example, an HDD (Hard Disk Drive).

The control component 2212 may analyze and process a signal SGL inputted from the host device 2100. The control component 2212 may control operations of the internal function blocks according to firmware or software for driving the SSD 2200. The RAM 2213 may be used as a working memory for driving such firmware or software.

The ECC component 2214 may generate parity data of data to be transmitted to the nonvolatile memory apparatuses 2231 to 223$n$. The generated parity data may be stored in the nonvolatile memory apparatuses 2231 to 223$n$ with the data. The ECC component 2214 may detect an error of data read from the nonvolatile memory apparatuses 2231 to 223$n$, based on the parity data. When the detected error falls within a correctable range, the ECC component 2214 may correct the detected error.

The memory interface 2215 may provide a control signal such as a command and address to the nonvolatile memory apparatuses 2231 to 223$n$, under control of the control component 2212. The memory interface 2215 may exchange data with the nonvolatile memory apparatuses 2231 to 223$n$, under control of the control component 2212. For example, the memory interface 2215 may provide data stored in the buffer memory device 2220 to the nonvolatile memory apparatuses 2231 to 223$n$, or provide data read from the nonvolatile memory apparatuses 2231 to 223$n$ to the buffer memory device 2220.

Figure 11:
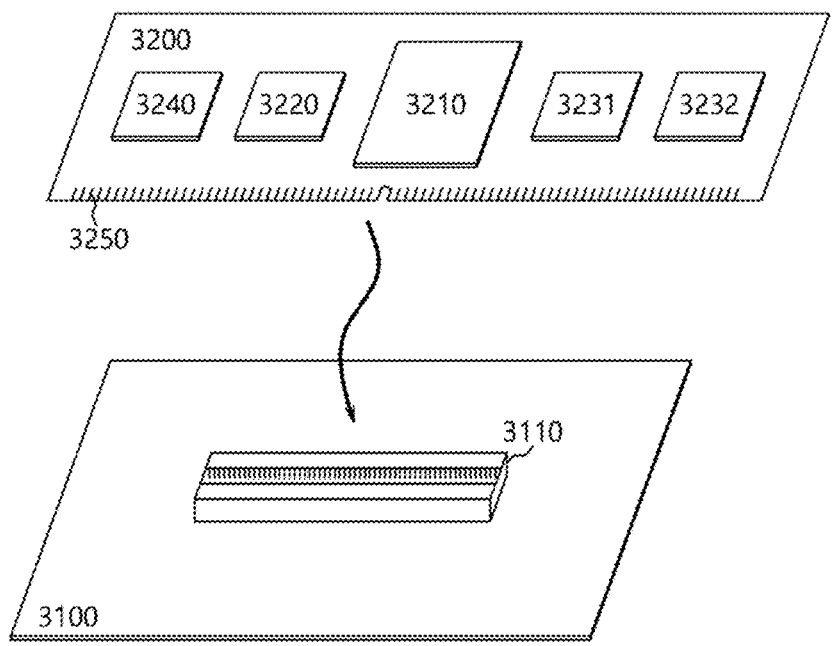
FIG. 11 is a diagram illustrating a data processing system including a data storage device in accordance with an embodiment.

FIG. 11 is a diagram illustrating a data processing system including a data storage device in accordance with an embodiment. Referring to FIG. 11, the data processing system 3000 may include a host device 3100 and a data storage device 3200.

The host device 3100 may be configured in the form of a board such as a printed circuit board. Although not illustrated, the host device 3100 may include internal function blocks for performing the function of the host device.

The host device 3100 may include a connection terminal 3110 such as a socket, slot or connector. The data storage device 3200 may be mounted on the connection terminal 3110.

The data storage device 3200 may be configured in the form of a board such as a printed circuit board. The data storage device 3200 may be referred to as a memory module or memory card. The data storage device 3200 may include a controller 3210, a buffer memory device 3220, nonvolatile memory apparatuses 3231 and 3232, a PMIC (Power Management Integrated Circuit) 3240 and a connection terminal 3250.

The controller 3210 may control overall operation of the data storage device 3200. The controller 3210 may be configured in the same manner as the controller 2210 illustrated in FIG. 10.

The buffer memory device 3220 may temporarily store data to be stored in the nonvolatile memory apparatuses 3231 and 3232. The buffer memory device 3220 may temporarily store data read from the nonvolatile memory apparatuses 3231 and 3232. The data temporarily stored in the buffer memory device 3220 may be transmitted to the host device 3100 or the nonvolatile memory apparatuses 3231 and 3232 under control of the controller 3210.

The nonvolatile memory apparatuses 3231 and 3232 may be used as storage media of the data storage device 3200.

The PMIC 3240 may provide power inputted through the connection terminal 3250 into the data storage device 3200. The PMIC 3240 may manage power of the data storage device 3200 under control of the controller 3210.

The connection terminal 3250 may be connected to the connection terminal 3110 of the host device. Through the connection terminal 3250, power and signals such as commands, addresses and data may be transferred between the host device 3100 and the data storage device 3200. The connection terminal 3250 may be configured in various ways depending on the interface method between the host device 3100 and the data storage device 3200. The connection terminal 3250 may be disposed on any side of the data storage device 3200.

Figure 12:
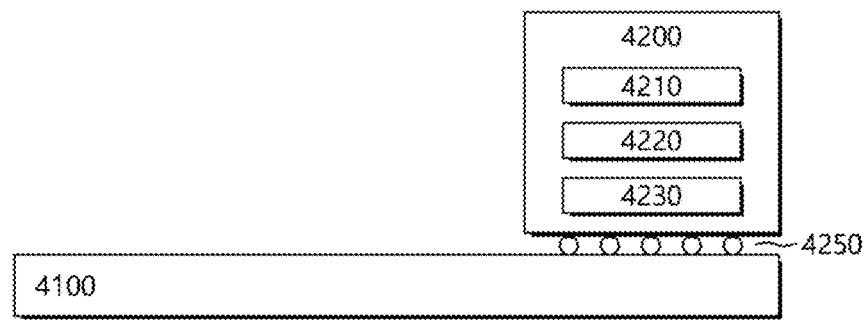
FIG. 12 is a diagram illustrating a data processing system including a data storage device in accordance with an embodiment.

FIG. 12 is a diagram illustrating a data processing system including a data storage device in accordance with an embodiment. Referring to FIG. 12, the data processing system 4000 may include a host device 4100 and a data storage device 4200.

The host device 4100 may be configured in the form of a board such as a printed circuit board. Although not illustrated, the host device 4100 may include internal function blocks for performing the function of the host device.

The data storage device 4200 may be configured in the form of a surface mount package. The data storage device 4200 may be mounted on the host device 4100 through solder balls 4250. The data storage device 4200 may include a controller 4210, a buffer memory device 4220 and a nonvolatile memory apparatus 4230.

The controller 4210 may control overall operation of the data storage device 4200. The controller 4210 may be configured in the same manner as the controller 2210 illustrated in FIG. 10.

The buffer memory device 4220 may temporarily store data to be stored in the nonvolatile memory apparatus 4230. The buffer memory device 4220 may temporarily store data read from the nonvolatile memory apparatus 4230. The data temporarily stored in the buffer memory device 4220 may be transmitted to the host device 4100 or the nonvolatile memory apparatus 4230 under control of the controller 4210.

The nonvolatile memory apparatus 4230 may be used as a storage medium of the data storage device 4200.

Figure 13:
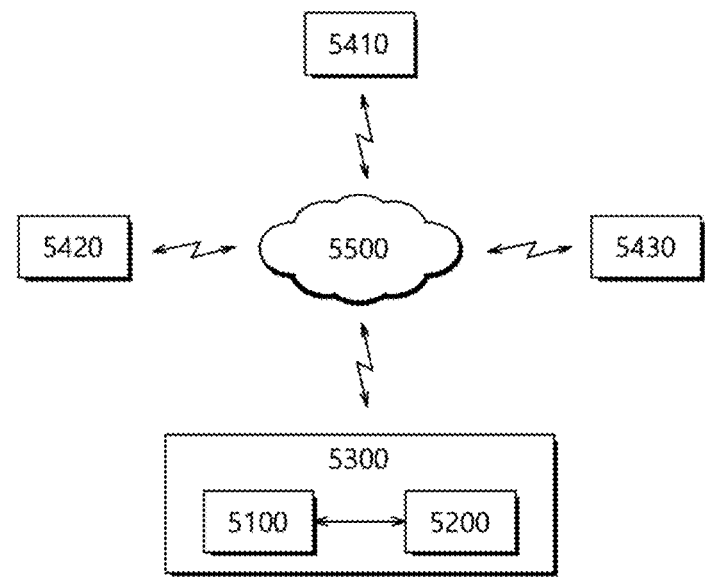
FIG. 13 is a diagram illustrating a network system including a data storage device in accordance with an embodiment.

FIG. 13 is a diagram illustrating a network system 5000 including a data storage device in accordance with an embodiment. Referring to FIG. 13, the network system 5000 may include a server system 5300 and a plurality of client systems 5410, 5420 and 5430 which are coupled through a network 5500.

The server system 5300 may service data in response to requests of the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and the data storage device 5200. The data storage device 5200 may be configured as the data storage device 10 of FIG. 1, the SSD 2200 of FIG. 9, the data storage device 3200 of FIG. 11 and the data storage device 4200 of FIG. 12.

Figure 14:
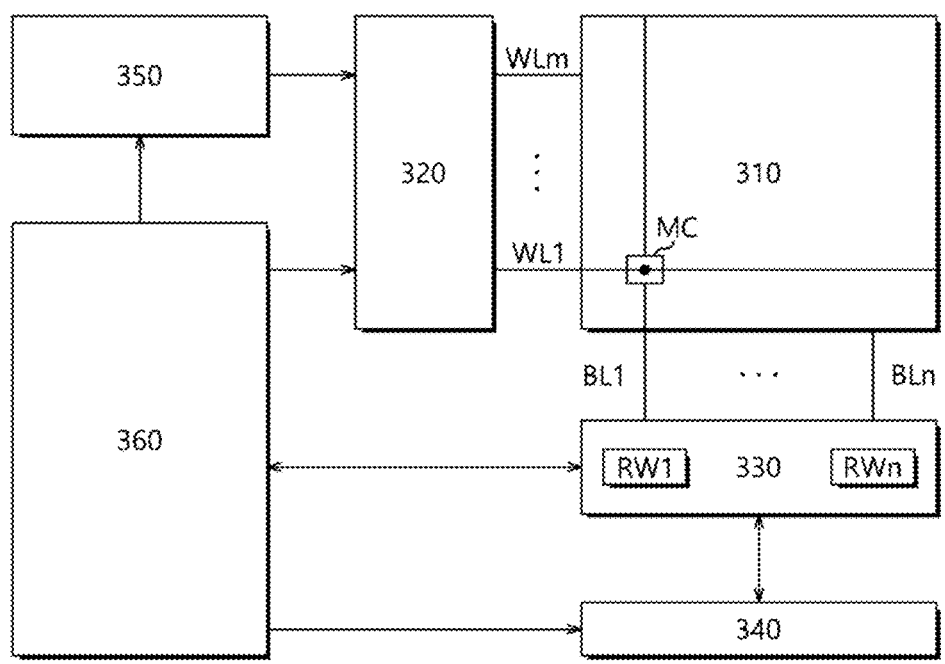
FIG. 14 is a block diagram illustrating a nonvolatile memory apparatus included in a data storage device in accordance with an embodiment.

FIG. 14 is a block diagram illustrating a nonvolatile memory apparatus included in a data storage device in accordance with an embodiment. Referring to FIG. 14, the nonvolatile memory apparatus 300 may include a memory cell array 310, a row decoder 320, a column decoder 330, a data read/write block 340, a voltage generator 350 and control logic 360.

The memory cell array 310 may include memory cells MC arranged at the respective intersections between word lines WL1 to WLm and bit lines BL1 to BLn.

The row decoder 320 may be coupled to the memory cell array 310 through the word lines WL1 to WLm. The row decoder 320 may operate under control of the control logic 360. The row decoder 320 may decode an address provided from an external device (not illustrated). The row decoder 320 may select and drive the word lines WL1 to WLm based on the decoding result. For example, the row decoder 320 may provide the word lines WL1 to WLm with a word line voltage provided from the voltage generator 350.

The data read/write block 340 may be coupled to the memory cell array 310 through the bit lines BL1 to BLn. The data read/write block 340 may include read/write circuits RW1 to RWn corresponding to the respective bit lines BL1 to BLn. The data read/write block 340 may operate under control of the control logic 360. The data read/write block 340 may operate as a write driver or a sense amplifier, depending on operation modes. For example, the data read/write block 340 may operate as a write driver for storing data, provided from the external device, in the memory cell array 310 during a write operation. For another example, the data read/write block 340 may operate as a sense amplifier for reading data from the memory cell array 310 during a read operation.

The column decoder 330 may operate under control of the control logic 360. The column decoder 330 may decode an address provided from the external device. The column decoder 330 may couple the read/write circuits RW1 to RWn of the data read/write block 340, corresponding to the respective bit lines BL1 to BLn, to a data input/output line (or data input/output buffer), based on the decoding result.

The voltage generator 350 may generate a voltage used for an internal operation of the nonvolatile memory apparatus 300. The voltages generated by the voltage generator 350 may be applied to the memory cells of the memory cell array 310. For example, a program voltage generated during a program operation may be applied to a word line of memory cells on which the program operation is to be performed. For another example, an erase voltage generated during an erase operation may be applied to well regions of memory cells on which the erase operation is to be performed. For still another example, a read voltage generated during a read operation may be applied to a word line of memory cells on which the read operation is to be performed.

The control logic 360 may control overall operation of the nonvolatile memory apparatus 300 based on a control signal provided from the external device. For example, the control logic 360 may control operations of the nonvolatile memory apparatus 300, such as read, write and erase operations of the nonvolatile memory apparatus 300.

While various embodiments have been illustrated and described, it will be understood to those skilled in the art that the embodiments described are examples only. Accordingly, the present invention is not limited by or to any of the described embodiments. Rather, the present invention encompasses all modifications and variations that fall within the scope of the claims.

What is claimed is:

1. A data storage device comprising:
a nonvolatile memory apparatus comprising a plurality of groups, each including one or more planes, the groups being operable as respective interleaving units; and
a controller configured to:
check whether a current read group including a read region of a current read command and a previous read group including a read operation of a previous read command completely or partially overlap and whether the read region of the current read command extends over two or more groups, when receiving the current read command, and
control the nonvolatile memory apparatus to perform cache read or interleaving read on the current read group based on the check result.

2. The data storage device according to claim 1, wherein when the group including the read region of the current read command is included in all or part of the group including the read region of the previous read command, the controller controls the nonvolatile memory apparatus to perform the cache read.

3. The data storage device according to claim 1, wherein when the read region of the current read command extends over two or more groups, the controller controls the nonvolatile memory apparatus to perform the cache read on the read region.

4. The data storage device according to claim 1, wherein when the group including the read region of the current read command is not included in the group including the read region of the previous read command, the controller controls the nonvolatile memory apparatus to perform the interleaving read.

5. The data storage device according to claim 1, wherein after transmitting a cache read command for instructing the nonvolatile memory apparatus to read second data, the controller checks whether a next read command among queued read commands is a cache read command or an interleaving read command and controls the nonvolatile memory apparatus to read third data or output the second data, based on the check result.

6. The data storage device according to claim 5, wherein when the next read command is an interleaving read command, the controller transmits an interleaving read command to the nonvolatile memory apparatus in order to instruct the nonvolatile memory apparatus to output the second data.

7. The data storage device according to claim 6, wherein when transmitting a cache read command to the nonvolatile memory apparatus in order to instruct the nonvolatile memory apparatus to output first data of a first data read operation immediately before a second data read operation, the controller checks a next read command after the second data read operation.

8. The data storage device according to claim 5, wherein when the next read command is a cache read command, the controller transmits the cache read command to the nonvolatile memory apparatus in order to instruct the nonvolatile memory apparatus to read the third data.

9. The data storage device according to claim 1, wherein the controller determines whether the group including the read region of the current read command is included in the group including the read region of the previous read command, based on queued read commands, start addresses and lengths of the queued read commands, and group information.

10. An operating method of a data storage device which includes a nonvolatile memory apparatus having a plurality of groups, each including one or more planes, the groups being operable as respective interleaving units, the operating method comprising the steps of:
receiving a read command;
checking whether a current read group including a read region of a current read command and a previous read group including a read region of a previous read command completely or partially overlap and whether the read region of the current read command extends over two or more groups; and
controlling the nonvolatile memory apparatus to perform cache read or interleaving read on the current read group based on the checking result.

11. The operating method according to claim 10, wherein the step of controlling the nonvolatile memory apparatus comprises the step of controlling the nonvolatile memory apparatus to perform the cache read, when the check result indicates that the group including the read region of the current read command is included in all or part of the group including the read region of the previous read command.

12. The operating method according to claim 10, wherein the step of controlling the nonvolatile memory apparatus comprises controlling the nonvolatile memory apparatus to perform the cache read on the read region, when the checking result indicates that the read region of the current read command extends over two or more groups.

13. The operating method according to claim 10, wherein the step of controlling the nonvolatile memory apparatus comprises the step of controlling the nonvolatile memory apparatus to perform the interleaving read, when the check result indicates that the group including the read region of the current read command is not included in the group including the read region of the previous read command.

14. The operating method according to claim 10, wherein the step of controlling the nonvolatile memory apparatus comprises:
transmitting a cache read command to instruct the nonvolatile memory apparatus to read second data;
checking a next read command among queued read commands; and
transmitting an interleaving read command to the nonvolatile memory apparatus in order to instruct the nonvolatile memory apparatus to output the second data, when the next read command is an interleaving read command.

15. The operating method according to claim 14, wherein the step of controlling the nonvolatile memory apparatus comprises checking a next read command after a second data read operation when transmitting a cache read command to the nonvolatile memory apparatus in order to instruct the nonvolatile memory apparatus to output first data of a first data read operation immediately before the second data read operation.

16. The operating method according to claim 10, wherein the step of controlling the nonvolatile memory apparatus comprises:
transmitting a cache read command to instruct the nonvolatile memory apparatus to read second data;
checking a next read command among queued read commands; and
transmitting a cache read command to the nonvolatile memory apparatus in order to instruct the nonvolatile memory apparatus to read third data, when the next read command is a cache read command.

17. An operating method of a controller, the operating method comprising:
- controlling a nonvolatile memory device to perform a cache read operation on planes disposed over two or more of plural groups in the nonvolatile memory device; and
- controlling the nonvolatile memory device to perform, in response to a current read command, the cache read operation on planes disposed in a current group among the plural groups when a previous group of a previous read command and the current group at least partially overlap in units of planes,
- wherein an interleaving read operation is performed on one or more planes disposed within each of the plural groups, and
- wherein the interleaving read operation is not performed on the planes disposed over two or more among the plural groups.

* * * * *